Nov. 1, 1966 A. I. PRESSMAN 3,283,180

LOGIC CIRCUITS UTILIZING TRANSISTOR AS LEVEL SHIFT MEANS

Filed March 22, 1963 3 Sheets-Sheet 1

INVENTOR.
ABRAHAM I. PRESSMAN
BY John V. Regan
ATTORNEY

INVENTOR.
ABRAHAM I. PRESSMAN
BY
John V. Regan
ATTORNEY

LOGIC CIRCUITS UTILIZING TRANSISTOR AS LEVEL SHIFT MEANS

Filed March 22, 1963

INVENTOR.
ABRAHAM I. PRESSMAN
BY John V. Regan
ATTORNEY

United States Patent Office 3,283,180
Patented Nov. 1, 1966

3,283,180
LOGIC CIRCUITS UTILIZING TRANSISTOR AS LEVEL SHIFT MEANS

Abraham I. Pressman, Elkins Park, Pa., assignor to Radio Corporation of America, a corporation of Delaware
Filed Mar. 22, 1963, Ser. No. 267,103
8 Claims. (Cl. 307—88.5)

This invention relates to logic circuits and, in particular, to high speed logic circuits such as "and" circuits, "or" circuits, "nor" circuits and the like.

Interconnections between the various logic circuits or blocks in a high speed digital information handling system generally are made by transmission lines in order to avoid deterioration of the pulse waveshape and to minimize radiation and crosstalk. One of the problems encountered in driving logic circuits from transmission lines is that heavy loading on a line may cause undesirably large reflections therein, resulting in spurious signals. This problem could be avoided for the most part if only one circuit were driven from each transmission line, and if the input impedance of the circuit were fixed at approximately the same value as the characteristic impedance of the line. In practice, however, the input impedance of a logic circuit is a variable quantity dependent upon the conditions of other input signals to the circuit. Also, the number of separate lines becomes undesirably large when many circuits are to be driven from the same source. It has been found that many circuits can be driven from a single, tapped transmission line, without objectionable reflections, when the input impedances of the various circuits are quite high relative to the characteristic impedance of the line, and when the line is terminated in its characteristic impedance.

Accordingly, it is one object of the present invention to provide logic circuits that have a high input impedance.

It is another object of this invention to provide improved logic circuits which may be driven from a tapped transmission line at high speed without causing objectionable signal reflections in the line.

The logic building block (logic circuit) should have a high output current to drive the relatively low impedance line and the output loads. The active device, a transistor for example, in the output stage of the circuit generally is driven between cut off and saturation in order to minimize dissipation in the transistor. Also, the input signals may be attenuated in the logic circuit. Operating the output transistor between cut-off and saturation insures that the output signal always varies between two desired and fixed signal levels. Level shifting means may be used at the input to the output stage transistor to assure that the transistor is either cutoff or fully conductive, as the case may be, for the different input signal conditions.

Various prior art level shifting means include (a) a resistor voltage divider network with a capacitor bypass in the coupling portion of the network, and (b) level shift diodes. The voltage divider arrangement suffers the disadvantages that the capacitor is sensitive to noise spikes and is repetition-rate sensitive, large voltage swings are often needed, the resistors dissipate power and generate heat, and operation of the network is affected by variations in the values of any of the components in the voltage divider and associated bias sources. In the level shift diode arrangement, tight specifications generally must be imposed on diode recovery time, and the forward voltage drop of the diode usually must be carefully controlled. A number of diodes usually are connected in series to assure reliable operation over a wide range of temperatures. Also, for high speed operation, the diodes must be able to pass sufficient reverse base current to provide fast turn-off of the driven transistor.

It is an object of this invention to provide logic circuits having improved level shifting means which has high noise immunity and which is not repetition-rate sensitive.

It is another object of this invention to provide logic circuits having level shifting means that supplies an accurately controlled current to the driven transistor, which current is fairly insensitive to component parameter variations.

Still another object of this invention is to provide logic circuits having improved level shifting means that can supply large reverse base current to the driven transistor for fast turn-off.

Briefly stated, the invention includes a gate having a number of transistors connected as emitter followers, an output transistor inverter, and level shift means comprising a transistor having its collector-emitter path connected between the control electrode of the output transistor and a point common to the emitter electrodes of all of the gate transistors. A first current device (current sink for NPN transistors, or current source for PNP transistors) is connected in common to the emitter electrodes of the gate transistors, and a second current device (current source for NPN transistors or current sink for PNP transistors) is connected to the base electrode of the level shift transistor. Depending upon the input signals applied to the gate transistors, current flows either between the first and second current devices, or between the second current device and the control electrode of the output transistor, whereby the output transistor is cutoff or biased into heavy conduction, respectively.

It is one feature of the invention that a large reverse base current is available for fast turn-off of the output transistor when the current capacity of the first current device is larger than the current capacity of the second current device.

According to another feature of the invention, the output voltage of the gate is such that, for one condition of the gate, the emitter-base junction of the level shift transistor is forward biased, causing its collector voltage to be sufficiently low to provide a large immunity to noise signals of one polarity tending to turn on the output transistor. In the other condition of the gate, the emitter-base junction of the level shift transistor is reverse-biased an amount sufficient to provide large immunity to noise signals of the other polarity tending to forward bias that emitter-base junction and turn-off the output transistor.

If desired, a number of input gates may be provided. Each of a like number of level shift transistors has its collector-emitter path connected between the control electrode of the output transistor and the output of a different input gate, whereby the level shift transistors serve the additional function of a logic gate.

Further, if desired, a number of output transistors may be provided for greater fan out, with each of a like number of level shift transistors having its emitter-collector path connected between the output of the input gate and the control electrode of a different output transistor. A separate current device may be connected to the base electrode of each different level shift transistor to avoid current hogging. By "fan out" is meant the number of loads that can be driven.

Additional features of the invention will become apparent from a consideration of the accompanying drawing, in which like reference characters denote like components, and in which.

Figure 1:
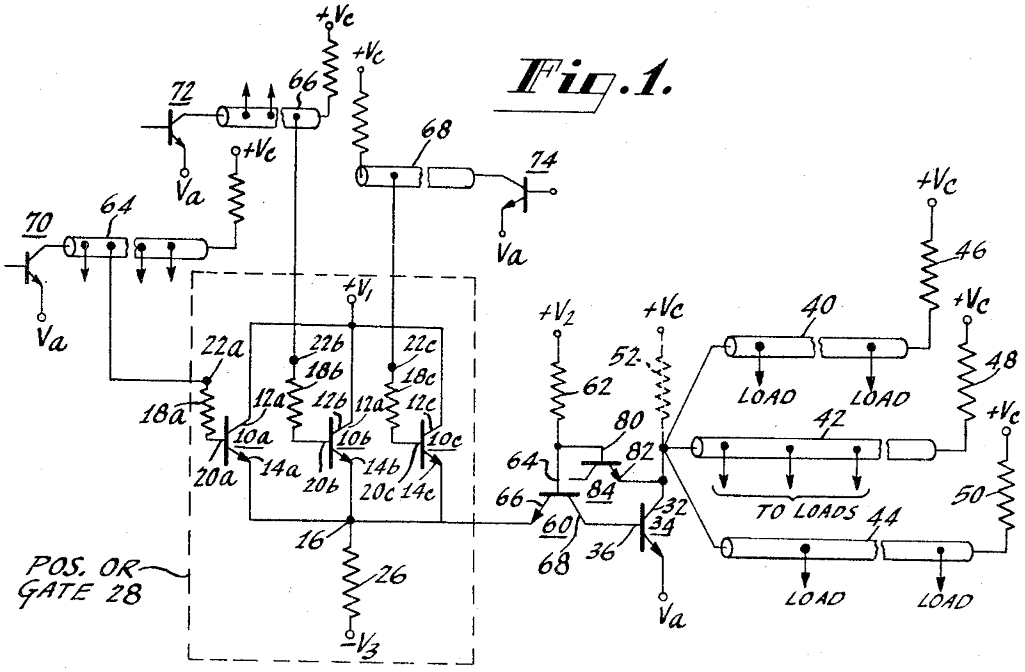
FIGURE 1 is a schematic diagram of a single level logic circuit according to the invention, employing a single input gate driven from different transmission lines, a single level shift transistor, and a single output transistor driving a combination of tapped and radial output transmission lines.

In FIGURE 1, a number of NPN type transistors 10*a* . . . 10*c* are connected in the common collector configuration by connecting their collector electrodes 12*a* . . . 12*c*, respectively, together and to a point of supply potential, designated $+V_1$ volts. The emitter electrodes 14*a* . . . 14*c* are connected directly to a common junction point 16, whereby the collector-emitter paths of all the transistors 10*a* . . . 10*c* are connected in parallel. Individual resistors 18*a* . . . 18*c* are connected between the base electrodes 20*a* . . . 20*c*, respectively, and individual input terminals 22*a* . . . 22*c* to the logic gate. A common emitter resistor 26 is connected between the junction point 16 and a source of forward emitter biasing potential, designated $-V_3$, whereby the gate transistors 10*a* . . . 10*c* operate as emitter followers. These emitter followers form a gate 28 for performing the positive "or" (negative of "and") logic function.

The output of the FIGURE 1 logic circuit is taken from the collector electrode 32 of an NPN type transistor 34, which is connected in the common emitter configuration. In a high speed digital system, it may be desired or required that connections between various logic circuits be made by way of transmission lines in order to reduce deterioration of the output pulse waveshape and to minimize radiation and crosstalk between various circuits. The various output loads, which may be other logic gates 28 of the type described previously, may be tapped from transmission lines 40, 42, 44 each of which has its input, or sending, end connected at the collector electrode 32. Transmission lines 40, 42, 44 are individually terminated in their characteristic impedance by means of resistors 46, 48, 50, respectively. The free ends of the terminating resistors 46, 48, 50 are connected to a source of collector biasing potential, designated $+V_C$. Although the FIGURE 1 circuit is particularly suitable for driving logic circuits at high speed by way of transmission lines, the circuit also may be used at lower speed where transmission lines are unnecessary. In the latter event, a collector supply resistor 52, illustrated in dashed lines, may be connected directly between collector electrode 32 and the $+V_C$ volt bias source. The output loads in the latter case would be connected directly at the collector electrode 32 or via wiring thereto.

As is well known, signal attenuation occurs in some transistor circuits, especially when the transistor is not driven between cut off and saturation. In the emitter follower gate circuit 28, for example, the voltage at the common junction 16 differs from the voltage at the most positive base electrode 20*a* . . . 20*c* by an amount equal to the drop across the associated emitter-base junction. The output transistor 34, in addition to providing high current gain for driving many loads, also operates to restore the output signal to the standard levels employed in the system. For this reason, the output transistor 34 is driven between cutoff and saturation, and the various bias levels in the output circuit are selected so that the voltage at the collector electrode 32 always has one of the two standard signal levels used in the system. Operating the output transistor between cut off and saturation, or close to saturation, has the further advantage of minimizing dissipation in the transistor, especially at high current levels.

Level shifting means is connected at the base electrode 36 of output transistor 34 to insure that the transistor 34 is either cutoff or in saturation for the different input signal conditions, and to provide immunity to noise signals. The level shifting means employed in FIGURE 1, and in the other figures to be described, takes the form of an NPN type transistor 60 having its collector 68-emitter 66 path connected between common junction 16 and base electrode 36 of output transistor 34. A resistor 62 is connected between the base electrode 64 of level shift transistor 60 and a source of positive bias, designated $+V_2$.

The inputs to the logic gate 28 may be transmitted to the input terminals 22*a* . . . 22*c* by means of separate transmission lines 64, 66, 68, respectively, and these transmission lines may, in turn, be driven from the output transistors 70, 72, 74, respectively, of other logic circuits.

In order to drive a logic circuit or circuits from a tapped transmission line without causing objectionable reflections in the line, it is necessary that the input impedances to the logic circuits be quite high relative to the characteristic impedance of the line. Otherwise the reflections may cause spurious signals and resulting false triggering of the driven logic circuits. The present invention takes advantage of certain desirable characteristics of an emitter follower. As is known, an emitter follower has a very high input impedance, requires relatively small base driven current, and is inherently faster than a transistor which is connected in the common emitter configuration because an emitter follower generally is not driven into saturation.

The collector supply voltage for the emitter followers preferably is selected to be more positive (assuming NPN transistors, as illustrated) than the most positive input signal level, so that the emitter followers do not saturate. The emitter supply voltage is chosen to be more negative than the least positive input signal level so that at least one of the emitter followers is always in conduction, that is to say, biased in the active region, thereby reducing turn-on time. By way of example only, and assuming input signal levels of zero volts and +3 volts, the various bias sources, which may be batteries, may have the following values:

$V_1=4$ volts
$V_2=4$ volts
$-V_3=-3$ volts
$V_a=0$ volt
$V_c=3$ volts

The use of emitter followers has generally been avoided in computer logic circuits because of their tendency to oscillate. This tendency is reduced by the input resistors 18*a* . . . 18*c*, which cut down the amount of positive feedback inherent in an emitter follower. The tendency to oscillate can be further reduced, when necessary, by connecting a resistor (not shown) between a point common to all of the collector electrodes 12*a* . . . 12*c* and the $+V_1$ volt bias source, and selecting the value of the bias source so that an emitter follower transistor operates close to saturation when the input signal applied thereto is at its most positive value. One of the greatest causes of oscillation in an emitter follower is a widely varying load. This is substantially eliminated in the FIGURE 1 circuit, and other circuits to be described, because the output transistor 34 and level shift transistor 60 serve to isolate the output loads from the emitter followers.

Common emitter resistor 26 is selected in value so that the combination of this resistor and the $-V_3$ volt bias source operates essentially as a current sink. Resistor 62, in the base circuit of level shift transistor 60, is selected in value so that it and the $+V_2$ volt bias source operate as a source of current. For reasons to be described, the parameters of the current sink preferably are selected so that, for given input conditions, the current sink has a capacity to receive more current than is supplied by the current source.

Consider now the operation of the FIGURE 1 logic circuit. The voltage at common junction 16 is high, relatively speaking, whenever the input applied at any one or more of the input terminals **22*a* . . . 22*c* is at its most positive level. On the other hand, the voltage at common junction 16 is low only when all of the inputs are low (least positive), whereby the gate 28 performs the positive "or" function (negative "and"). Assuming that the bias sources have the values mentioned previously, and input signal levels of zero volts and +3 volts, the corresponding voltages at common junction 16 may be of the order of −0.7 volt and +2.3 volts, respectively, when gate transistors 10*a* . . . 10*c*** are silicon. (The forward voltage drop across the emitter-base junction of a silicon transistor is approximately 0.7 volt.)

The emitter-base junction of level shift transistor 60 is forward biased when the voltage at common junction 16 is −0.7 volt. After an initial switching transient, all of the current from the current source (resistor 62 and the $+V_2$ volt source) flows across the base 64-emitter 66 junction to the current sink (resistor 26 and the $-V_3$ volt source). The only current that flows in the collector 68 circuit is any small leakage current then present, and the collector electrode 68 is more or less floating. Level shift transistor 60 acts much as a transistor in saturation or on the verge of saturation and, since the base 64 current is high, the collector 68 voltage may be about 0.05 volt more positive than the emitter 66 voltage, or about −0.65 volt. In any event, the base-emitter junction of the output transistor 34 is reverse biased and the output voltage at collector electrode 32 is about +3 volts. The reverse bias is such as to provide better than one volt of immunity to positive going noise spikes; that is to say, the voltage at common junction 16, or emitter electrode 66, can rise by one volt due to noise spikes without turning on the output transistor 34.

When any input signal to the gate 28 goes high, to +3 volts, the voltage at common junction 16 rises to approximately +2.3 volts. However, the base-emitter junction of the output transistor 34 becomes forward biased before the voltage at common junction 16 reaches this value. The voltage at the base electrode 64 then clamps at a value $+V_B$, equal to the sum of the voltage drops across the base-emitter junction of output transistor 34 and the collector-base junction of level shift transistor 60. When the voltage at common junction 16 rises to a value more positive than $+V_B$, the base 64-emitter 66 junction becomes reverse biased, and all of the current from the current source is steered across the base 64-collector 68 junction as forward base current to the output transistor 34. The output transistor 34 conducts heavily, and the output voltage at collector electrode 32 falls to approximately zero volts.

The emitter 66-collector 68 interelectrode capacitance of the level shift transistor 60 plays a desirable part in the circuit's operation, during the switching transient, in that it aids in fast turn-on of output transistor 34. This capacitance, however, does not appear to appreciably reduce noise immunity or to interfere with repetition rate at practical operating speeds. When output transistor 34 is full "on," the reverse bias of the base 64-emitter 66 junction is high enough to provide about one volt of immunity to negative noise spikes.

Essentially, the level shift transistor 60 operates under control of the voltage at common junction 16 to steer the current from the current source either to the current sink or to the base 36 of output transistor 34. A base 36 current, easily calculable and largely insensitive to component tolerances, is provided by the combination of resistor 62 and the $V_2$ volt bias source when the voltage at common junction 16 is high. This current, $I_B$, is determined as follows:

$$I_B=\frac{V_2-V_B}{R_{62}}$$

where $R_{62}$ is the resistance value of resistor 62 and $V_B$ the voltage at base 64. Since $V_B$ is the sum of $V_a$, the relatively constant voltage drops across the base 64-collector 68 junction of level shift transistor 60 and the base-emitter junction of output transistor 34, and $+V_2$ is usually three or four times larger than $V_B$, this "on" base 36 current is relatively constant. Its percentage variation is primarily the sum of the variations in the values of resistor 62 and the $+V_2$ bias source. Many other level shift schemes, such as a resistor voltage divider network, derive the "on" base current as a small difference between two large currents, which has the undesirable feature that a small percentage change in one of the currents causes a large change in the "on" current.

By properly selecting the values of $V_2$ and the resistor 62, a predetermined current can be supplied to the base electrode 36 to control the degree of base drive to the output transistor 34. This is an advantage in that it makes the circuit relatively easy to "worst case" design. Because of transistor action, some additional current is supplied to the base electrode 36 through the collector 68-emitter 66 path of level shift transistor 60. However, this latter current can be held to a relatively small value by choosing a level shift transistor 60 which has a very low inverse beta. For example, a 2N744 or a 2N834 silicon epitaxial transistor has an inverse beta as low as one-tenth. In any event, this latter current can be taken into consideration in the "worst case" design of the circuit.

Assuming that output transistor 34 is in saturation when the input is high, minority charge carriers are stored in the base region thereof. Accordingly, the emitter-base junction of this transistor does not become reverse biased, when the voltage at common junction 16 next falls to its low value, until the transistor 34 is brought out of saturation. A large reverse base current to provide fast turn-off of output transistor 34 is available by selecting the parameters of the current sink so that, when the voltage at common junction 16 is −0.7 volt, the current sink has a capacity to receive more current than is supplied by the current source. The difference in the current values is available as reverse base 36 current through the emitter 66-collector 68 path of level shift transistor 60. By selecting resistor 26 to have a low value, this reverse base current can be made quite large without heavy loading on the input drive transistors 70, 72, 74, since the controlling currents required at the inputs to the gate transistors **10*a* . . . 10*c* are lower by a factor of beta. The interelectrode capacitance between emitter 66 and collector 68 also is effective in aiding in fast turn-off of output transistor 34**.

The speed with which output transistor 34 is switched from the "off" condition to the full "on" condition depends, in part, on the amount of base 36 drive current supplied during the switching transient. It sometimes is desirable to limit the degree of saturation in output transistor 34, or even to prevent saturation, without a sacrifice in the turn-on base drive. This may be accomplished in the FIGURE 1 circuit by connecting the base 80 and emitter 82 electrodes of a transistor 84 to the base electrode 64 of level shift transistor 60 and the collector electrode 32 of output transistor 34, respectively. The collector of transistor 84 is left floating. Alternatively, a diode may be connected between the latter electrodes. Transistor 84 may be omitted when its use is not desired or necessary.

The output transistor 34 is biased "off" and the output voltage at collector electrode 32 is about +3.0 volts when the voltage at common junction 16 is low, or about −0.7 volt. Accordingly, the base 80-emitter 82 junction of transistor 84 is reverse biased. All of the current from the current source then flows through the base 64-emitter 66 junction to the current sink.

When the voltage at common junction 16 rises toward +2.3 volts, the base 64-emitter 66 junction becomes reverse biased. All of the current from the current source is supplied to the base electrode 36 of output transistor 34 during the initial switching transient, providing high turn-on drive. However, after output transistor 34 turns on, the voltage at collector 32 falls toward zero volts. The base 80-emitter 82 junction of transistor 84 becomes forward biased when the collector 32 voltage becomes less positive than the base 64 potential. A portion of the current from the current source then is diverted through the base 80-emitter 82 junction, resulting in reduced base 36 current for output transistor 34, and either reducing the degree of saturation thereof or bringing the output transistor out of saturation.

When output transistor 34 is full "on," its base 36 voltage is less positive than the voltage at base 64 of level shift transistor 60 by an amount equal to the forward drop across the base 64-collector 68 junction. At the same time, the collector 32 voltage is less positive than the voltage at base 64 by the forward drop across the base 80-emitter 82 junction of transistor 84. The latter transistor 84, for example, may be selected to have a desired drop relative to the drop across the base 64-collector 68 junction for either predetermining the degree of saturation in output transistor 34, or for operating the transistor 34 out of saturation.

Figure 2:
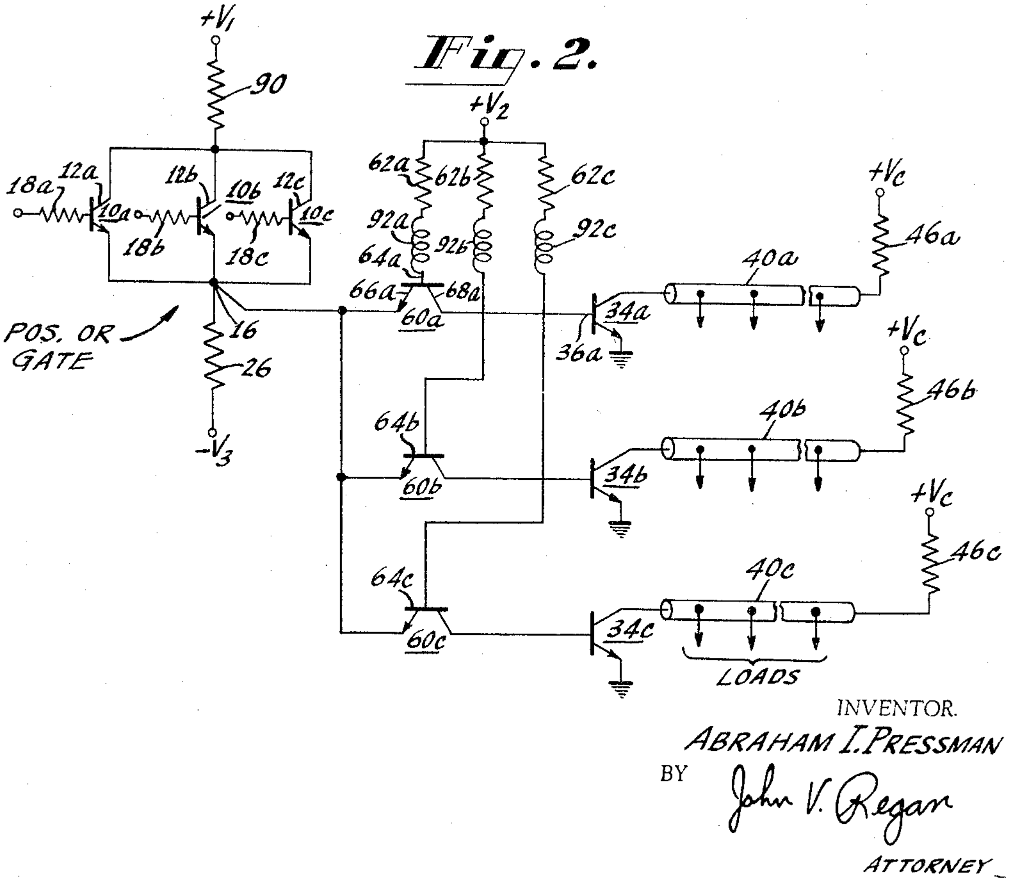
FIGURE 2 is a schematic diagram of another single level logic circuit according to the invention, wherein a number of output transistors and associated level shift transistors are employed with a single input gate for increased fan out (output) capability.

FIGURE 2 is a modified version of the FIGURE 1 circuit having very high fan-out for driving a large number of output loads. The emitter follower "or" gate of FIGURE 2 is the same as that of FIGURE 1 described previously, with the exception that a resistor 90 is connected between a point common to the collector electrodes **12*a* . . . 12*c* of the gate transistors 10*a* . . . 10*c*, respectively, and the $+V_1$ bias source. This resistor 90**, as previously explained, helps to prevent oscillations in the emitter followers.

A number of output transistors **34*a* . . . 34*c*, three shown by way of illustration, are connected in the grounded emitter configuration and each drives a number of output loads, indicated by arrows, over a separate transmission line. Each of the transmission lines 40*a* . . . 40*c* is terminated in its characteristic impedance by connecting a resistor 46*a* . . . 46*c***, respectively, between the output end of the line and the collector supply source, designated $+V_C$.

A separate level shift transistor **60*a* . . . 60*c* is provided for each of the output transistors 34*a* . . . 34*c*, respectively, and each level shift transistor has its collector-emitter path connected between the common junction 16 of the input gate and the base electrode of the associated output transistor. For example, the emitter electrode 66*a* of level shift transistor 60*a* is connected to the common junction 16; the collector electrode 68*a* is connected to the base electrode 36*a* of output transistor 34*a*. A separate current source is provided for each of the level shift transistors 60*a* . . . 60*c*. The current source for transistor 60*a* comprises a resistor 62*a* and an inductor 92*a* serially connected between the base electrode 64*a* and the $+V_2$ volt bias source. Each of the other level shift transistors 60*b*, 60*c*** has a similar current source.

Operation of the FIGURE 2 circuit arrangement is similar generally to that of the FIGURE 1 circuit described previously. The emitter-base junctions of all of the level shift transistors **60*a* . . . 60*c* are forward biased, and all of the output transistors 34*a* . . . 34*c* are nonconducting, when the voltage at common junction 16 is low, relatively speaking. The current from each of the current sources in the level shift means flows across the base-emitter path of the associated level shift transistor to the current sink (resistor 26 and the $-V_3$ volt bias source). The current sink parameters are adjusted so that, when the junction 16 voltage is low, the current sink has a capacity to receive more current than is supplied by all of the current sources. In the quiescent condition, one or more of the gate transistors 10*a* . . . 10*c*** also supplies current to the sink.

All of the emitter-base junctions of the level shift transistors **60*a* . . . 60*c* are reverse biased when the voltage at common junction 16 is high, relatively speaking. All of the output transistors 34*a* . . . 34*c* then are biased in the "on" condition, and the current from the current source associated with each level shift transistor is supplied to the base of the associated output transistor. All of the base electrodes 64*a* . . . 64*c* of level shift transistors 60*a* . . . 60*c***, respectively, may be connected to a single current source rather than separate current sources. However, the use of separate current sources is preferred in order to avoid any problem in current "hogging" at the base electrode of that output transistor having the lowest impedance.

The use of inductors in the base circuits of the level shift transistors **60*a* . . . 60*c* aids in fast turn-on and turn-off of the output transistors 34*a* . . . 34*c* by maintaining high current flow during the switching transient. Assuming that the voltage at common junction 16 is about −0.7 volt in the low condition, the potentials at each of the base electrodes 64*a* . . . 64*c* are more positive than this value by an amount equal to the drop across the forward biased base-emitter junction of the associated level shift transistor. This base potential may be somewhere around zero volts for the values given. On the other hand, the potentials at the base electrodes 64*a* . . . 64*c* are more positive than the latter value when the voltage at common junction 16 is high. The potential at a base electrode, 64*a* for example, may be of the order of +1.5 volts, the sum of the voltage drops across the forward biased base-emitter junction of the output transistor 34*a* and the forward biased base-collector junction of the level shift transistor 60*a*. Accordingly, it may be seen that the base current of a level shift transistor is higher when the voltage at common junction 16 is low. That is to say, a level shift transistor supplies more current to the common junction 16** than to the base of the associated output transistor.

The inductors **92*a* . . . 92*c* in the base circuits of the level shift transistors 60*a* . . . 60*c*, respectively, act to sustain this higher value of base current in transistors 60*a* . . . 60*c* during the initial switching transient when the voltage at common junction 16 rises from −0.7 to +2.3 volts. This higher value of current is supplied to the base electrode of the associated output transistor during the transient period and results in increased turn-on overdrive for fast turn-on of the output transistor. Following this switching transient, the base current of each of the level shift transistors 60*a* . . . 60*c* falls to its lower value. The inductors 92*a* . . . 92*c* serve to sustain the base currents at the lower value during the initial transient when the voltage at common junction 16 falls from +2.3 volts to −0.7 volt. However, the voltage at common junction 16 then is such as to demand the higher value of current from the level shift transistors, and the additional current requirement is fulfilled during the switching transient by drawing reverse base currents from the output transistors 34*a* . . . 34*c*. The latter action results in a hard turn-off of the output transistors 34*a* . . . 34*c***.

By way of example only, and not meaning to be limited thereby, a circuit of the FIGURE 2 configuration may have the following component values:

| Resistors | Bias sources |
|---|---|
| 18a, b, c=75 ohms | $V_1$=+3 volts |
| 26=205 ohms | $V_2$=+3 volts |
| 46a, b, c=75 ohms | $V_3$=−5 volts |
| 62a, b, c=422 ohms | $V_C$=+3 volts |
| 90=17.8 ohms | |
| *Transistors* | *Inductors* |
| 10a, b, c=2N2475 | 92a, b, c=4.7 M Henry |
| 34a, b, c=2N2475 | *Transmission lines* |
| 60a, b, c=2N744 | 40a, b, c=75 ohms ($Z_0$) |

Figure 3:
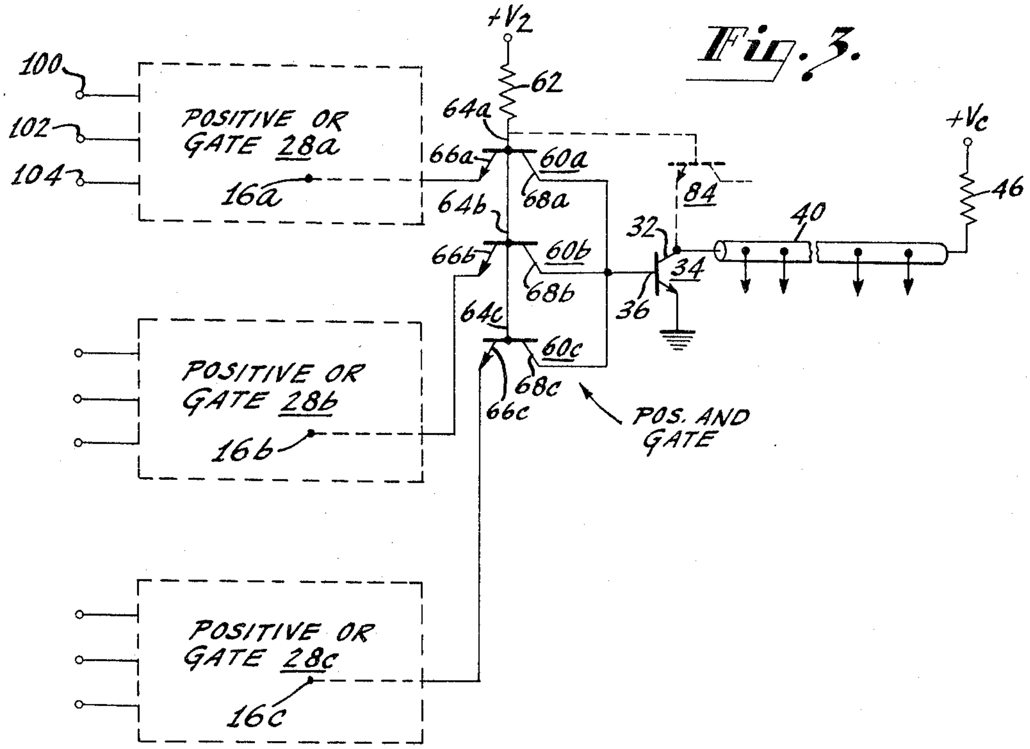
FIGURE 3 is a diagram, partly in schematic and partly in block form, of a two-level logic circuit according to the invention.

A two level logic circuit according to the invention is illustrated, partly in block form and partly in schematic, in FIGURE 3. A number of input gates 28a . . . 28c are represented by dashed blocks, and each of these gates may be the same as the gate 28 of FIGURE 1. The output of the logic circuit arrangement is taken from the collector electrode 32 of an NPN output transistor 34, which is connected in the grounded emitter configuration.

A number of level shift transistors 60a . . . 60c, one for each input gate, are provided. Each level shift transistor has its collector electrode connected to the base electrode 36 of output transistor 34, and has its emitter electrode connected to the common junction at the output of a different input gate. For example, emitter electrode 66a of level shift transistor 60a is connected to the common junction 16a of input gate 28a. The level shift transistors 60a . . . 60c, in addition to performing the level shift function also operate together as a positive "and" gate, whereby they perform the second level of logic in the circuit. The base electrodes 64a . . . 64c of the level shift transistors are connected together and to one end of a resistor 62. The other end of resistor 62 is connected to the $+V_2$ volt bias source. Resistor 62 and the $+V_2$ volt bias source operate as a current source in the same manner as the equivalent elements in the FIGURE 1 circuit.

Each of the input gates 28a . . . 28c is an emitter follower gate which performs the positive "or" logic function. The voltage at the common junction of a gate, junction 16a for example, is high, relatively speaking, when one or more of the input signals applied at points 100, 102, 104 is high (these points may be input terminals 22a . . . 22c, or they may be taps on different transmission lines, not shown). The emitter 66a-base 64a junction of level shift transistor 60a is reverse biased when the voltage at common junction 16a is high. In like manner, the base-emitter junctions of the level shift transistors 60b and 60c are reverse biased when the voltages at corresponding common junction points 16b and 16c are high. On the other hand, it is apparent that the emitter-base junction of a level shift transistor is forward biased when the voltage at the common junction point of the associated input gate is low, relatively speaking; this occurs only when all of the inputs to that input gate are low.

The current from the current source in the base circuits of the level shift transistors 60a . . . 60c is steered either to one or more of the common junction points 16a . . . 16c or to the base 36 of output transistor 34 under control of the voltages at the common junctions 16a . . . 16c. Current from this source flows across an emitter-base junction when the voltage at the associated common junction 16a . . . 16c is low. No current from this source is supplied to the base 36 of output transistor 34 when any one or more of the base-emitter junctions is forward biased. However, when the voltages at all of the common junctions 16a . . . 16c go high, the base-emitter junctions of all of the level shift transistors 60a . . . 60c become reverse biased; the current from the source then is supplied to the base 36 of output transistor 34 through the forward biased base-collector junctions of all the level shift transistors. Thus it is seen that the level shift transistors perform the positive "and" logic function.

The current sinks connected at the common junctions 16a . . . 16c in the input gates preferably should be arranged so that each has a capacity to receive more current than is supplied by the single current source when the voltage at its associated junctions 16a . . . 16c is low. This is so because all of the current from the level shift network flows to the sink in an input gate when the voltage at the common junction of that input gate is low and the voltages at the common junctions of the remaining input gates are concurrently high. By so arranging the current receiving capacity of the current sinks, a large reverse base current may be drawn from the output transistor 34 for fast turn-off thereof, as discussed previously in connection with the FIGURE 1 circuit.

Figure 4:
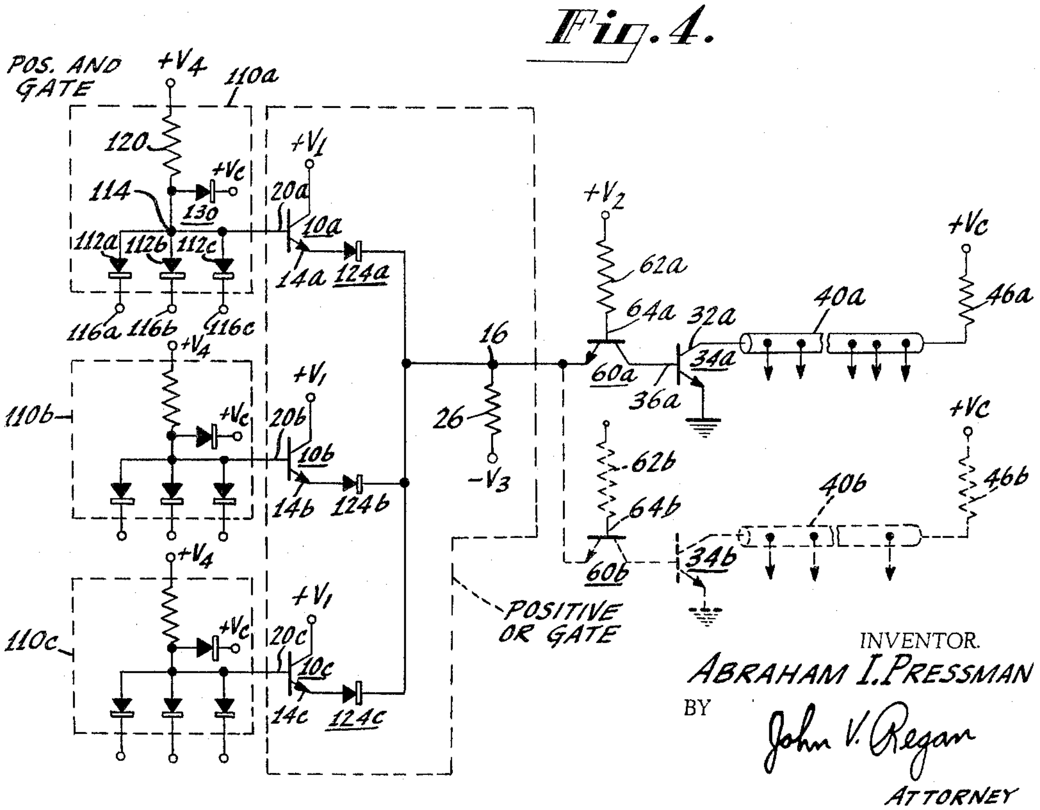
FIGURE 4 is a schematic diagram of still another two-level logic circuit according to the invention, wherein the outputs of a number of first diode gates are applied to different inputs of a second, emitter-follower gate, and wherein diodes in the output circuitry of the second gate provide isolation for greater fan in (number of inputs) and/or additional level shift.

Another embodiment of a two level logic circuit arrangement is illustrated in FIGURE 4. This circuit arrangement includes a number of diode "and" gates 110a, 110b, 110c, three shown by way of illustration. Gate 110a, which is typical of the other gates, comprises a number of diodes 112a, 112b, 112c, three shown, having their anodes connected together at a common junction point 114. Separate input terminals 116a . . . 116c are connected to the cathodes of the diodes 112a . . . 112c, respectively. Input signals may be supplied to these input terminals by way of separate, tapped transmission lines. A resistor 120 is connected between the junction 114 and a source of bias potential, designated $+V_4$.

The output at the common junction 114 of input gate 110a is connected directly to the base electrode 20a of a first emitter follower transistor 10a. The emitter electrode 14a of this transistor is connected to a common junction point 16 by way of diode 124a, which is poled, or directed, to pass forward emitter current in the easy current flow direction of the diode 124a. The outputs of the other two diode gates 110b, 110c are applied directly to the base electrode 20b, 20c, respectively, of other emitter follower transistors 10b and 10c, respectively. The emitter electrodes 14b and 14c of the latter transistor are connected to the common junction point 16 by way of diodes 124b, 124c, respectively, and a common emitter resistor 26 is connected between the junction 16 and a source of bias potential of $-V_3$ volts. The three transistors 10a . . . 10c perform the positive "or" logic function.

As in the FIGURE 1 circuit, the input signals to the circuit may be either zero volts or +3 volts. The voltage at the junction 114 of the first diode gate 110a is low, or zero volts, whenever the inputs at one or more of the input terminals 116a . . . 116c is zero volts (neglecting diode drop). On the other hand, the voltage at junction 114 rises to +3 volts whenever the inputs at all of the terminals 116a . . . 116c are +3 volts. In order to prevent the associated emitter follower transistor 10a from saturating in the event that the input voltages rise above +3 volts, a clamp diode 130 may be connected between the junction 114 and a source of clamp potential, designated $+V_3$, which is +3 volts for the signal values given.

It is necessary that the impedance seen looking into the input terminals 116a . . . 116c be high relative to the characteristic impedance of the transmission lines connected at these points; otherwise large signal reflections may occur in the transmission lines with the possibility of false triggering of other logic gates connected to those lines. Advantage is taken here of the very high input impedance and relatively small base drive requirements of an emitter follower transistor. Because of these characteristics, a diode input gate need supply only a small amount of current to the base of the connected emitter follower transistor. For this reason, the resistor 120 may be made quite large in value in order to limit the current flowing through diodes 112a . . . 112c to a small enough value to prevent heavy loading on the driving transmission lines.

The output of the logic circuit arrangement may be a single transistor 34*a* connected in the common emitter configuration. The output loads may be tapped from a transmission line 40*a* which is connected at its receiving end to the collector electrode of transistor 34*a*, and which is terminated in its characteristic impedance by a resistor 46*a* connected between the output end of the line 40*a* and a source of collector bias supply, designated $+V_C$. A level shift means (transistor 60*a* and associated circuitry) of the type previously discussed, may be connected between the base electrode 36*a* of output transistor 34*a* and common junction 16 at the output of the emitter follower gate. If additional fan-out capability is desired or required, one or more additional output transistors, such as the transistor 34*b* shown in dashed lines, may be connected by way of separate level shift means (transistor 60*b* and associated circuitry) to the common junction 16.

In actual practice, there is a voltage drop across the diodes 112*a* . . . 112*c* in each of the input gates 110*a* . . . 110*c* which, absent diodes 124*a* . . . 124*c*, has the effect of raising the voltage at the common junction 16 above the values given in earlier discussion. That is to say, instead of the voltage at common junction 16 being either −0.7 volt or +2.3 volts, the values will be higher by an amount equal to the forward drop across a diode in an input gate. Assuming by way of example that the drop across a diode is of the order of 0.7 volt, it may be possible under certain circumstances that the output transistor 34*a* may be turned on when the voltage at common junction 16 is at its low value. In any event, this higher voltage at common junction 16 reduces the immunity of the circuit to positive noise spikes which tend to turn on the output transistor 34*a* when the voltage at common junction 16 is low. This is prevented in the FIGURE 4 circuit by means of the diodes 124*a* . . . 124*c* in the emitter circuits of the gate transistors 10*a* . . . 10*c*, respectively. Assuming that the forward drop across any of these latter diodes is the same as the drop across a forward biased input diode 112*a* . . . 112*c*, the voltage drops cancel each other, whereby the voltage at common junction 16 varies between the same or substantially the same values as in the FIGURE 1 circuit.

The diodes 124*a* . . . 124*c* serve another important function, namely, increasing fan-in capability. By "fan-in capability" is meant the number of inputs which may be received. Each of the emitter follower transistors 10*a* . . . 10*c* has capacitance between its emitter and base electrodes. It is necessary to discharge this capacitance when an emitter follower transistor is switched from its high conducting condition to its low conducting condition, and the current for discharging this capacitance must flow into the current sink connected at common junction 16. If the number of input circuits is large, a large portion of the current capacity of this sink 16 may be required to discharge the capacitance, and an upper limit is reached beyond which the circuit no longer functions in an optimum manner.

Each of the diodes 124*a* . . . 124*c* serves to disconnect the emitter electrode of the associated transistor 10*a* . . . 10*c* from common junction 16 when the transistor is switched to its low conducting condition. This disconnect feature of the diodes allows a greater number of input gates and emitter follower transistors to be connected in the circuit. Operation of the remainder of the circuit is similar to those described previously, and a detailed description of its operation is therefore not given here. It will be understood, however, that the circuit arrangement of FIGURE 4 has the desirable features of the FIGURE 1 arrangement. Some of these features are: high turn-off overdrive for output transistor 34; a controlled base drive current for output transistor 34, easily calculable and fairly independent of changes in component values; high fan-out; and large noise immunity. The same is true for the circuit embodiments of FIGURES 2 and 3.

Figure 5:
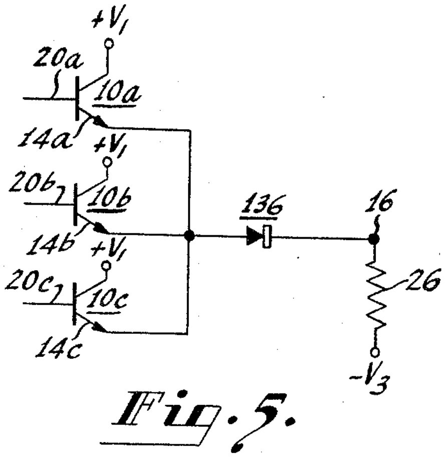
FIGURE 5 is a schematic diagram of another form of positive "or" gate which may be used in the arrangement of FIGURE 6.

When the number of input gates is not too large, separate diodes 124*a* . . . 124*c* generally are unnecessary. The positive "or" gate of FIGURE 4 then may be replaced by the positive "or" gate of FIGURE 5. In FIGURE 5, a single diode 136 has one electrode connected to the common junction point 16 and has its other electrode connected in common to all of the emitter electrodes 14*a* . . . 14*c* of the gate transistors 10*a* . . . 10*c*, respectively. The diode 136 compensates for the voltage shift at the base electrodes 20*a* . . . 20*c* due to the diode input gates, and restores the voltage levels at the common junction point 16 to desired values.

Although the circuit arrangements of FIGURES 1–4 are illustrated as employing NPN type transistors, it will be apparent that PNP type transistors may be used instead, provided that the usual changes are made in the polarities of the various bias sources and the connections to the diodes (FIGURE 4). When PNP transistors are used, the resistor and bias source in the emitter circuit of an input gate serve as a current source instead of a current sink, and the resistor and bias source in the base circuit of a level shift transistor serve as a current sink instead of a current source. The term "current device" appearing herein above, in the brief statement of invention, and in the appended claims is used in a generic sense to denote either a current sink or a current source.

Figure 6:
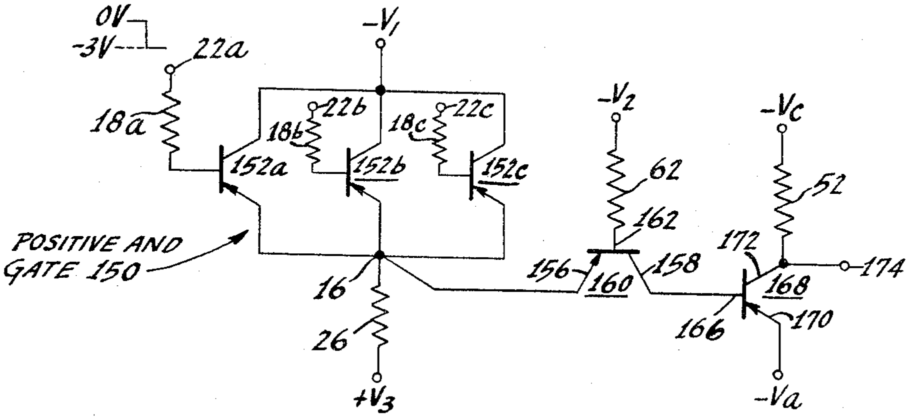
FIGURE 6 is a schematic diagram of a single level logic circuit employing PNP transistors.

In order to illustrate the use of PNP transistors, there is shown in FIGURE 6 a schematic diagram of a simplified version of the FIGURE 1 circuit, with the NPN transistors replaced by PNP transistors and with the polarities of the bias sources reversed. The input gate 150 comprises three PNP transistors 152*a* . . . 152*c* having their collector-emitter paths connected in parallel between a common source of collector bias, designated $-V_1$, and a common emitter junction 16. A first current device, which serves as a current source, is connected in the common emitter circuit and includes a resistor 26 and a source of bias voltage, designated $+V_3$.

The emitter 156-collector 158 path of a PNP level shift transistor 160 is connected between the common junction 16 and the base electrode 166 of a PNP output transistor 168. The emitter electrode 170 of the output transistor 168 is connected directly to a source of bias of $-V_a$ volts, which may be circuit ground, and the collector electrode 172 is connected by a resistor 52 to a source of collector supply potential, designated $-V_c$. A second current device, in this case a current sink, is connected in the base 162 circuit of the level shift transistor and comprises a resistor 62 and a source of bias potential, designated $-V_2$.

Input signals applied at the input terminals 22*a* . . . 22*c* of the gate 150 have a nominal value of either zero volts or −3 volts. Due to the voltage drop across an emitter-base diode, the voltage at common junction 16 is about 0.7 volt more positive than the negative-most input voltage. In particular, the voltage at common junction 16 is high, about +0.7 volt, when all input signals are high, or zero volts, and is low, or about −2.3 volts when any input signal is low, or about −3 volts. Accordingly, input gate 150 performs the positive "and" (negative "or") logic function.

When the voltage at common junction 16 is high (0.7 volt), the base 162-emitter 156 junction of level shift transistor 160 is forward biased, and current from the current source (resistor 26 and the $+V_3$ volt source) flows across the base 162-emitter 156 junction to the current sink (resistor 62 and the $-V_2$ volt source). For a given current source, the current taken up by the current sink is determined primarily by the values of resistor 62 and the $-V_2$ volt source. The base 166-emitter 170 junction of output transistor 168 then is reverse biased and the voltage at output terminal 174 is −3 volts. The reverse bias is such as to provide better than one volt of immunity to negative going noise spikes.

When any input signal to the input gate 150 goes low to −3 volts, the voltage at common junction 16 falls to approximately −2.3 volts. The base 166-emitter 170 junction of output transistor 168 becomes forward biased before the common junction 16 voltage falls to −2.3 volts, and clamps the voltage at the base 162 of the level shift transistor 160 at a value sufficient to reverse bias the base 162-emitter 156 junction. The forward base current of the output transistor 168 is taken up by the current sink in the base 162 circuit of the level shift transistor. The voltage at output terminal 174 then is zero volts. As in the FIGURE 1 circuit, the base current for output transistor 168 is easily calculable and largely insensitive to component tolerances, the base current being determined primarily by the value of resistor 62 and the $-V_2$ volt bias source in the current sink. A high turn-off overdrive for output transistor 168 is obtained when the parameters of the current source are selected so that the current source can supply more current than can be taken up by the current sink for the particular common junction 16 voltages.

What is claimed is:

1. The combination comprising:

an output transistor of one conductivity type connected in the common emitter configuration and having a base electrode and a collector electrode;

a logic gate having a plurality of gate transistors of said one conductivity type connected as emitter followers;

a junction point;

circuit means connecting the emitter electrodes of all of said gate transistors to said junction point;

a first current device connected at said junction point;

a level shift transistor of said one conductivity type having its emitter connected to said junction point and having its collector connected to the base electrode of said output transistor;

a second current device connected at the base electrode of said level shift transistor, one of the first and second current devices being a current source and the other being a current sink;

means for selectively applying input signals at the base electrodes of said gate transistors to vary the voltage at said junction point between first and second values for forward biasing and reverse biasing respectively, the emitter-base junction of said level shift transistor; and unidirectional conducting means connected between the base electrode of said level shift transistor and the collector electrode of said output transistor to control the voltage at said collector electrode in the "on" condition of said output transistor.

2. The combination comprising:

a plurality of gate transistors connected in the common collector configuration and having base and emitter electrodes;

means connecting each of said emitter electrodes to a common junction point;

a common emitter resistor having one terminal connected to said junction point;

means connecting the other terminal of said resistor to a point of fixed potential;

a number of output transistors connected in the common emitter configuration and each having base and collector electrodes;

output load means each connected to the collector electrode of a different output transistor;

a like number of level shift transistors each having a base electrode, an emitter electrode connected to said common junction, and a collector electrode connected to the base electrode of a different output transistor;

a like number of resistors each having one terminal connected to the base electrode of a different one of said level shift transistors;

means for applying operating potential at the other terminal of each of the latter said resistors having a polarity to forward bias the base-collector junctions of all of said level shift transistors and the emitter-base junctions of all of said output transistors when the emitter-base junctions of all of said level shift transistors are reverse biased; and means for selectively applying input signals at the base electrodes of said gate transistors to vary the voltage at said common junction between first and second values for forward biasing and reverse biasing, respectively, the emitter-base junctions of all of said level shift transistors.

3. The combination comprising:

a first logic gate including a plurality of transistors connected in the common collector configuration and having base and emitter electrodes, a junction point, means connecting each of the emitter electrodes to said junction point, a common emitter resistor and a source of biasing potential serially connected between said junction point and the collector electrodes of said transistors;

at least one other logic gate like said first logic gate;

an output transistor connected in the common emitter configuration and having a base electrode and a collector electrode;

output means connected to the collector electrode of said output transistor;

a number of level shift transistors, one for each logic gate, each having a base electrode, an emitter electrode connected to the junction point of a different logic gate, and a collector electrode connected to the collector electrodes of all other level shift transistors and to the base electrode of said output transistor;

a resistor having one terminal connected to the base electrodes of all of said level shift transistors;

means for applying a bias voltage between the other terminal of the last-mentioned resistor and the emitter electrode of said output transistor, said bias voltage having an amplitude and polarity to forward bias the base-collector junctions of all level shift transistors and the base-emitter junction of said output transistor only when the emitter-base junctions of all of the level shift transistors are reverse biased; and means for selectively applying input signals at the base electrodes of the transistors in the various logic gates to vary the voltage at each said junction point between first and second values for forward biasing and reverse biasing, respectively, the emitter-base junction of the corresponding level shift transistor.

4. The combination comprising:

a number of diode gates each having an output terminal and a number of input terminals, a like number of gate transistors connected in the common collector configuration and each having its base electrode connected to a different said output terminal;

a common junction point;

a separate unidirectional conducting device connecting the emitter electrode of each different one of said gate transistors to said junction point;

a common emitter resistor having one terminal connected to said junction point;

means for connecting the other terminal of said resistor to a point of fixed potential;

an output transistor having a base electrode and an emitter electrode;

a level shift transistor of the same conductivity type as said gate transistors having its emitter electrode connected to said junction point and having its collector electrode connected to the base electrode of said output transistor;

a base resistor having one terminal connected to the base electrode of said level shift transistor;

means connecting a source of bias potential between the other terminal of said base resistor and the emitter electrode of said output transistor, said latter source having a magnitude and polarity to forward bias the collector-base junction of said level shift transistor and the base-emitter junction of said output transistor when the emitter-base junction of said level shift transistor is reverse biased; and means for selectively applying input signals at said input terminals to vary the voltage at said junction point between first and second values for forward biasing and reverse biasing, respectively, the emitter-base junction of said level shift transistor.

5. The combination comprising:

a number of diode gates each having an output terminal and a number of input terminals;

a like number of gate transistors of one conductivity type connected in the common collector configuration and each having its base electrode connected to a different said output terminal;

a common junction point;

a single unidirectional conducting device connected between said junction point and the emitter electrodes of all of said gate transistors, said device being connected to pass forward emitter current for said gate transistors;

a common emitter resistor having one terminal connected to said junction point;

means connecting the other terminal of said common emitter resistor to a point of fixed potential;

an output transistor of said one conductivity type having a base electrode and an emitter electrode;

a level shift transistor of said one conductivity type having its emitter electrode connected to said junction point and having its collector electrode connected to the base electrode of said output transistor;

a base resistor having one terminal connected to the base electrode of said level shift transistor;

means connecting a source of bias potential between the other terminal of said base resistor and the emitter electrode of said output transistor, said source having a polarity and magnitude to forward bias the collector-base junction of said level shift transistor and the base-emitter junction of said output transistor when the emitter-base junction of said level shift transistor is reverse-biased; and means for selectively applying input signals at said input terminals to vary the voltage at said junction point between first and second values for forward biasing and reverse biasing, respectively, the emitter-base junction of said level shift transistor.

6. An output transistor connected in the common emitter configuration and having a collector electrode and a base electrode;

output means connected to said collector electrode;

a plurality of diode gates each comprising a number of diodes having one like electrode connected in common to a first junction point, a resistor having one terminal connected to said first junction point, and means for applying an operating potential at the other terminal and said resistor;

a like plurality of gate transistors connected in the common collector configuration and each having a base electrode connected to a different said first junction point, and an emitter;

a second, common junction point;

a separate unidirectional conducting device connected between said second junction point and the emitter electrode of a different gate transistor, each said unidirectional conducting device being connected to conduct forward emitter current in its easy flow direction;

a common emitter resistor having one terminal connected to said second junction point;

means for applying a bias voltage at the other terminal of said common emitter resistor and having a polarity tending to forward bias the undirectional conducting devices;

a level shift transistor having a base electrode, an emitter electrode connected to said second junction point, and a collector electrode connected to the base electrode of said output transistor;

a resistor and a source of bias potentially serially connected between the base electrode of said level shift transistor and the emitter electrode of said output transistor, said source having a magnitude and polarity to forward bias the base-collector junction of said level shift transistor and the emitter-base junction of said output transistor when the emitter-base junction of said level shift transistor is reverse biased; and means for selectively applying input signals at the other electrodes of each of the gate diodes for varying the potential at said second, common junction point between first and second values for forward biasing and reverse biasing, respectively, the emitter-base junction of said level shift transistor.

7. An output transistor connected in the common emitter configuration and having a collector electrode and a base electrode;

output means connected to said collector electrode;

a plurality of diode gates each comprising a number of diodes having one like electrode connected in common to a first junction point, a resistor having one terminal connected to said first junction point, and means for applying an operating potential at the other terminal of said resistor;

a like plurality of gate transistors connected in the common collector configuration and each having a base electrode connected to a different said first junction point, and an emitter;

a second, common junction point;

a unidirectional conducting device having one electrode connected to said second junction point;

means connecting the emitter electrodes of all of said gate transistors to the other electrode of said unidirectional conducting device, said unidirectional conducting device being connected to supply forward emitter current for said gate transistors in the easy current flow direction of said unidirectional conducting device;

a common emitter resistor having one terminal connected to said second junction point;

means for applying a bias voltage to the other terminal of said common emitter resistor of a polarity to forward bias said unidirectional conducting device;

a level shift transistor having a base electrode, an emitter electrode connected to said second junction point, and a collector electrode connected to the base electrode of said output transistor;

a resistor and a source of bias potential serially connected between the base electrode of said level shift transistor and the emitter electrode of said output transistor, said source having a magnitude and polarity to forward bias the base-collector junction of said level shift transistor and the emitter-base junction of said output transistor when the emitter-base junction of said level shift transistor is reverse biased; and means for selectively applying input signals at the other electrode of each of the diodes in said gates for varying the potential at said second junction point between first and second values for forward biasing and reverse biasing, respectively, the emitter-base junction of said level shift transistor.

8. The combination comprising:

an output transistor connected in the common emitter configuration and having base and collector electrodes;

a tapped transmission line connected at one end to the collector electrode of said output transistor;

a collector supply resistor having one terminal connected to the other end of said transmission line;
means for applying a bias voltage at the other terminal of said collector supply resistor;
separate output loads connected to different taps on said transmission line;
a plurality of gate transistors connected in the common collector configuration and having base and emitter electrodes;
a junction point;
circuit means connecting the emitter electrode of each of said gate transistors to said junction point;
a common emitter resistor having one terminal connected to said junction point;
means for applying, at the other terminal of said emitter resistor, a bias voltage having a polarity to forward bias the base-emitter junction of at least one of said gate transistors for all input signal conditions;
a level shift transistor having a base electrode, an emitter electrode connected to said junction point and a collector electrode connected to the base electrode of said output transistor;
a resistor having one terminal connected to the base electrode of said level shift transistor;
means biasing the other terminal of the last-mentioned resistor relative to the emitter electrode of said output transistor to forward bias the collector-base junction of said level shift transistor and the emitter-base junction of said output transistor when the emitter-base junction of said level shift transistor is reverse biased; and
means for selectively applying input signals at the base electrodes of said gate transistors to vary the voltage at said junction point between first and second values for forward biasing and reverse biasing, respectively, the emitter-base junction of said level shift transistor.

References Cited by the Examiner

UNITED STATES PATENTS

| | | | |
|---|---|---|---|
| 2,535,377 | 12/1950 | Titterton | 328—94 |
| 2,745,956 | 5/1956 | Baker | 328—94 |
| 2,862,171 | 11/1958 | Freeborn | 307—88.5 |
| 2,986,652 | 5/1961 | Eachus | 307—88.5 |
| 3,015,733 | 1/1962 | Vignos et al. | 307—88.5 |
| 3,016,466 | 1/1962 | Richards | 307—88.5 |
| 3,040,186 | 6/1962 | Van Ruger | 307—88.5 |
| 3,058,007 | 10/1962 | Lynch | 307—88.5 |
| 3,092,729 | 6/1963 | Cray | 307—88.5 |
| 3,124,707 | 3/1964 | Thomasson | 307—88.5 |
| 3,217,181 | 11/1965 | Zuk | 307—88.5 |

OTHER REFERENCES

1962 International Solid-State Conference Digest of Technical Papers, February 14, 1962, pages 10 and 11 relied on.

ARTHUR GAUSS, *Primary Examiner.*

B. P. DAVIS, *Assistant Examiner.*